United States Patent [19]

Shiflet

[11] 4,233,350
[45] * Nov. 11, 1980

[54] FORMAMINOUS SHEET

[75] Inventor: Frank L. Shiflet, Waynesboro, Va.

[73] Assignee: Hopeman Brothers, Inc., Waynesboro, Va.

[*] Notice: The portion of the term of this patent subsequent to Nov. 20, 1995, has been disclaimed.

[21] Appl. No.: 952,726

[22] Filed: Oct. 19, 1978

Related U.S. Application Data

[63] Continuation-in-part of Ser. No. 787,838, Apr. 15, 1977, Pat. No. 4,126,725, which is a continuation-in-part of Ser. No. 627,750, Oct. 31, 1975, Pat. No. 4,033,084.

[51] Int. Cl.³ .............................................. B32B 5/12
[52] U.S. Cl. ...................................... 428/110; 428/134; 428/138; 428/256
[58] Field of Search ............... 156/177, 178, 180, 181, 156/252, 253, 296, 179, 219, 288; 428/105, 107, 108, 112, 131, 247, 255, 256, 110, 134, 140, 156, 285, 457

[56] References Cited

U.S. PATENT DOCUMENTS

| 2,125,583 | 8/1938 | Reed | 189/82 |
|---|---|---|---|
| 2,257,993 | 10/1941 | Young | 140/7 |
| 2,423,547 | 7/1947 | Behlen | 210/169 |
| 3,049,796 | 8/1962 | Pall | 29/183.5 |
| 3,132,099 | 5/1964 | Eilhauer | 156/181 X |
| 3,435,127 | 3/1969 | Rose et al. | 428/256 |
| 3,619,319 | 11/1971 | Utz | 156/296 X |
| 3,755,054 | 8/1973 | Medney | 156/181 X |
| 3,836,416 | 9/1974 | Ropiequet | 156/181 X |
| 3,949,111 | 4/1976 | Pelletier | 156/296 X |
| 4,059,713 | 11/1977 | Mercer | 156/181 X |
| 4,080,232 | 3/1978 | Friedrich | 156/181 X |
| 4,126,725 | 11/1978 | Shiflet | 428/110 |

FOREIGN PATENT DOCUMENTS 559479 7/1958 Canada .................................... 50/164

Primary Examiner—Bruce H. Hess
Attorney, Agent, or Firm—George A. Smith, Jr.

[57] ABSTRACT

A foraminous sheet having properties similar to those of a sheet formed by perforation is made by arranging filaments in overlying groups to produce a non-woven mesh, and applying pressure to the overlying groups so that the intersections of the filaments are flattened to an extent such that the sheet which is produced has a substantially uniform thickness except at the locations of its openings and in the immediate vicinity thereof. The filaments of the mesh are fused together at their intersections in the pressure application step. Fusion of the filaments as well as flattening are aided by the application of heat.

4 Claims, 6 Drawing Figures

FORMAMINOUS SHEET

CROSS REFERENCE TO RELATED APPLICATION

This application is in part a continuation of my copending application Ser. No. 787,838, filed Apr. 15, 1977, now U.S. Pat. No. 4,126,725, issued Nov. 21, 1978 which is in turn a continuation-in-part of my application Ser. No. 627,750, filed Oct. 31, 1975, now U.S. Pat. No. 4,033,084, issued July 5, 1977. The entire disclosure of said copending application is incorporated herein by reference.

SUMMARY OF THE INVENTION

This invention relates to the manufacture of foraminous sheets, and particularly to the manufacture of foraminous sheets from filamentary material. The invention has particular utility in the manufacture of foraminous sheets for use in the reinforcement of composite laminates, and will be described in that context. However, the utility of the product made in accordance with the invention extends to a wide variety of products including, for example, components of acoustical panels, covers for radiators, registers and convectors used in space heating systems, and various types of louvers.

As explained in my copending application, steel foil sheets can be used advantageously as components of decorative laminates to improve their dimensional stability and thereby prevent deformation under conditions of low humidity. The incorporation of steel foil layers in melamine-faced phenolic laminates in the manner described in my copending application makes it possible to use such laminates as facings for low-strength wallboard cores. Desirably, openings are provided in the steel foil sheets to provide better adhesion between the various layers of the laminate by allowing bridges of phenolic resin to extend through the openings in the steel foil sheet.

There are several known methods for producing metal sheets having patterns of holes. For example, the patterns of holes can be produced by perforation. The process of perforation produces a product which is very flat except at the locations of the perforations. However, it is expensive to carry out, and involves a substantial waste of material. Another disadvantage of the perforation method becomes apparent when it is desired to produce a pattern of small holes located very close together. When the punched holes are small and close together, the width of the punch holder prohibits punching adjacent holes with the same blow. Thus, for patterns of small, closely-spaced holes, several blows of the punch press are required for each row of holes.

Foraminous metal sheets can also be produced by a weaving process. However, these sheets are in the form of screens, and are not sufficiently flat to be used as reinforcements in decorative laminates, as it is difficult if not impossible to prevent the screen pattern from affecting the surface texture of the laminate. Another difficulty with the woven screen is that its shear strength or stiffness in the plane of the screen is relatively poor compared to that of the perforated sheet. Even if the wires of the screen are fused together at their intersections, the resulting screen would still not have a shear strength in the plane of the screen comparable to that of the perforated sheet.

Another form of foraminous sheet known as "expanded metal" can be made by producing a pattern of slits in a metal sheet and expanding the slits into diamond-shaped holes. Expanded metal sheets, however, do not have sufficient tensile and compressive strength in the plane of the sheet perpendicular to the long axis of the diamond-shaped openings to be useful in the reinforcement of decorative laminates.

The principal object of the invention is to overcome the various disadvantages of perforated, woven and expanded metal sheets, and to produce a foraminous sheet which is inexpensive to manufacture, but which has a degree of flatness and strength comparable to that of a perforated sheet. The manufacture of the foraminous sheet in accordance with the invention is carried out by arranging filaments into first and second overlying groups, the filaments in each group being spaced from and parallel to one another and being non-parallel to the filaments in the other group, and applying pressure to the overlying groups. Preferably, the pressure is sufficient to deform the filaments at least at the intersections so that the foraminous sheet produced has a substantially uniform thickness except at the locations of its openings and in the immediate vicinity thereof. When the sheet is to be incorporated in some high pressure decorative laminates, it is not necessary to fuse the filaments together at their intersections, and the pressure application step is necessary only in order to produce the degree of flatness necessary to prevent the sheet from affecting the texture of the surface of the laminate.

In some cases, however, the pressure applied in the formation of the sheet can be made sufficient to flatten the sheet and at the same time fuse the filaments together at their intersections. Peferably, heat is applied to the overlying groups in order to facilitate flattening and to facilitate fusion of the intersecting filaments in the pressure application step.

Various other objects of the invention will be apparent from the following detailed description when read in conjunction with the drawings.

DETAILED DESCRIPTION

Figure 1:
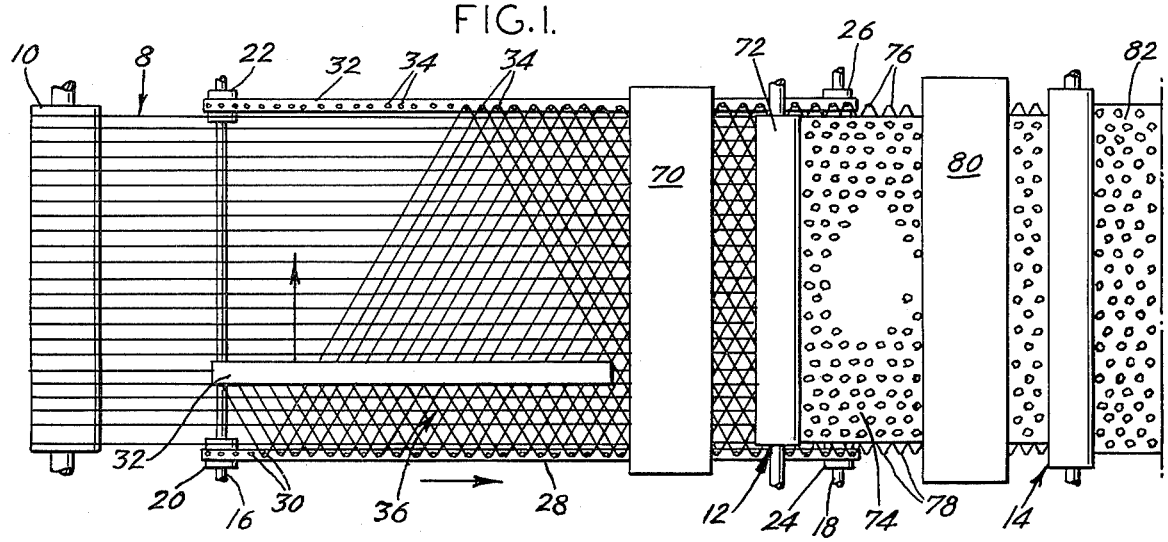
FIG. 1 is a diagrammatic top plan view of an apparatus for making foraminous sheets in accordance with the invention by producing three overlying groups of filaments.

Referring to FIG. 1, a first group 8 of steel wires is fed over a grooved roll 10. The wires are supplied from individual supply reels (not shown), and suitable wire brakes (not shown) are provided to maintain tension. The grooves in roll 10 maintain the desired spacing between the wires in group 8. Longitudinal feed of the wires in group 8 is accomplished by the action of the flattening roll assemblies 12 and 14.

First and second sprocket shafts 16 and 18 are located respectively at a position adjacent roll 10, and at a position just beyond flattening roll assembly 12. Sprocket shaft 16 is provided with a pair of sprockets 20 and 22, located on opposite sides of wire group 8, adjacent the outermost wires in the group. Sprockets 24 and 26 on shaft 18 are aligned respectively with sprockets 20 and 22. A continuous chain 28 having a series of anchoring pins 30, is driven by one of sprockets 20 and 24, the other sprocket being an idler. Anchoring pins 30 are provided at uniform intervals on the exterior of chain 28, and are preferably short pins having rounded ends to facilitate the release of wires loops at the location of sprocket 24. The uppermost length of chain 28 (the length shown in FIG. 1) is aligned with wire group 8, and anchoring pins 30 extend slightly above the plane of the wire group in order to receive and hold the wires fed by cross feed member 32. Chain 28 is synchronized with the movement of wire group 8, and its uppermost length travels at the same speed and in the same direction as does the wire group. Chain 32 is similarly situated on the opposite side of the wire group between sprockets 22 and 26, and is provided with a uniformly spaced series 34 of anchor pins which extend just above the plane of wire group 8.

Cross feed member 32 reciprocates back and forth across wire group 8 in a direction perpendicular to the wires of group 8.

An array of wires fed from individual supply reels (not shown) are fed by cross feed 32, suitable brakes (not shown) being provided to maintain tension in these wires. As cross feed 32 reciprocates, the wires being fed by it are wrapped around the anchor pins on the respective chains 28 and 32, and the movement of the chains causes the wires being fed by the cross feed to assume a zigzag pattern.

In the preferred form of the apparatus, the number of wires fed by cross feed 32 is the same as the number of wires in group 8, and the spacing of the wires at the feed points (measured in the direction parallel to the wires of group 8) is equal to 1.15 times the spacing between the wires of group 8 . Also, the rate of movement of cross feed 32 is set so that the wires fed by it assume and maintain a 60° angle with respect to the wires of group 8. In this way, a uniform zigzag feed is achieved, and the wires of each of the three groups laid down by the apparatus are disposed at a 60° angle with respect to the wires of each of the other groups. Of course, cross feed 32 can be operated at a different speed and with a different number of feed wires to produce similar results, although the wires of the respective groups will not then be disposed at a 60° angle with respect to each other.

Figure 2:
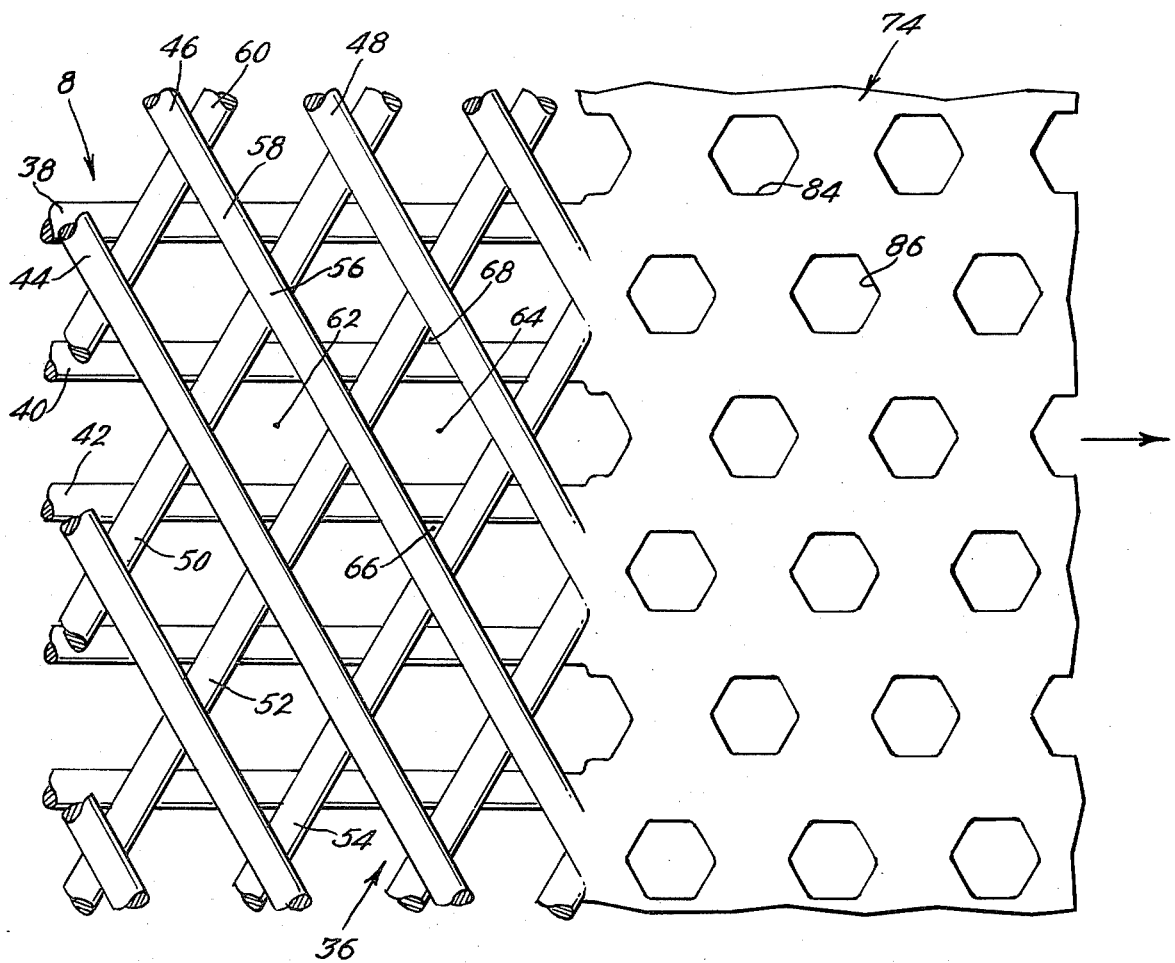
FIG. 2 is a fragmentary plan view showing the three overlying groups of filaments and illustrating the manner in which they are formed into a foraminous sheet.

The operation of the cross feed produces a mesh 36, the details of which are shown at the left-hand side of FIG. 2. The mesh is made up of a first group 8 comprising wires 38, 40, 42 etc., a second group comprising wires 44, 46, 48 etc., and a third group comprising wires 50, 52, 54 etc. The wires in each group are parallel to one another, and are uniformly spaced.

Because of the manner in which cross feed 32 operates, it will be apparent that the entire mesh produced by the apparatus of FIG. 1 will consist of a series of triangular sections in which the group of oblique wires corresponding to wires 44, 46 and 48 are alternately located above and below the group of oblique wires corresponding to wires 50, 52 and 54. The fact that these alternating triangular sections are produced, however, does not affect the final product, as the entire mesh is flattened by flattening roll assemblies 12 and 14 to produce a uniform product.

Again referring to FIG. 2, the groups of wires are preferably laid out so that each crossing of the wires of each pair of groups is located substantially midway between adjacent pair of wires of the remaining group. For example, the crossing of wires 50 and 46 at intersection 56 is located substantially midway between wires 38 and 40. Similarly, the crossing of wires 38 and 46 at intersection 58 is located substantially midway between wires 50 and 60. This arrangement, assuming that the wires of each group are disposed at a 60° angle with respect to the wires of each other group, results in a mesh having hexagonal openings such as those at 62 and 64. Triangular openings such as those at 66 and 68 are also produced, but, if the diameter of the wires is properly chosen in relation to the spacings between them in the respective groups, these triangular openings will become filled in the flattening process, so that only the hexagonal openings remain.

Returning to FIG. 1, the mesh produced by the action of cross feed 32 is fed through a heater diagrammatically shown at 70. This heater can be, for example, a gas-fired furnace, or an induction furnace. The heat imparted to the wire mesh by heater 70 is sufficient to raise the temperature of the wires in the mesh to a softening point. Roll assembly 12 is positioned just beyond heater 70 so that the wires of the mesh remain in the softened condition as they enter the rollers. Only upper roll 72 of roll assembly 12 is shown, it being understood that a similar roll is provided on the underside of the mesh. An additional pressure roll can be provided above roll 72, if necessary to impart adequate pressure to the mesh. The rolls of roll assembly 12 are motor driven at a speed coordinated with the speed of operation of cross feed 32 and with the speed of operation of chains 28 and 32. The length of roll 72 is such that it extends substantially across the entire mesh, but its ends do not reach anchor pins 30 and 34 so that clearance is provided for movement of the anchor pins beyond the roll assembly toward sprockets 24 and 26. The roll at the underside of the mesh has a length corresponding to that of roll 72.

Roll assembly 12 feeds the wire mesh, and at the same time flattens the mesh so that a foraminous sheet 74 emerges from the roll assembly. This foraminous sheet has wire loops such as those indicated at 76 and 78 located along its opposite edges, as a result of the fact that roll assembly 12 does not extend all the way to the edges of the wire mesh. The temperature of sheet 74 is again raised by heater 80, and roll assembly 14 (which is similar to roll assembly 12) effects a further flattening of the sheet, and, as it extends beyond the wire loops at the edges of the sheet, it flattens them also. The ultimate produce is a foraminous sheet 82, which emerges from roll assembly 14. The additional heater 80 and roll assembly 14 can be eliminated in some instances, depending upon the degree of flattening desired.

Returning to FIG. 2, it will be seen that foraminous sheet has an array of hexagonal openings 84, 86, etc., which result from the flattening of the wire mesh entering roll assembly 12. Sufficient pressure is applied by the roll assembly, or by the combination of roll assemblies to produce a product which is similar in appearance so that of a sheet perforated with hexagonal openings, i.e. the surface of the sheet is substantially uniform in thickness except at the locations of the openings, and in the immediate vicinity thereof. The circular cross-section of the wires prevents the product from being perfectly flat in the immediate vicinity of the openings.

The product shown in FIG. 2, having a staggered array of openings, has a substantially uniform tensile strength in all directions in the plane of the sheet, and is therefore especially desirable as a reinforcement in composite laminates.

A similar product can be made using the apparatus of FIG. 1 by eliminating the longitudinal group 8 of filaments, and forming two overlying layers by the operation of cross feed 32. The sheet produced by flattening such an array of wires has a staggered array of rhombic or rhomboidal openings, and can be used as a laminate reinforcement, or for various other purposes.

Figure 3:
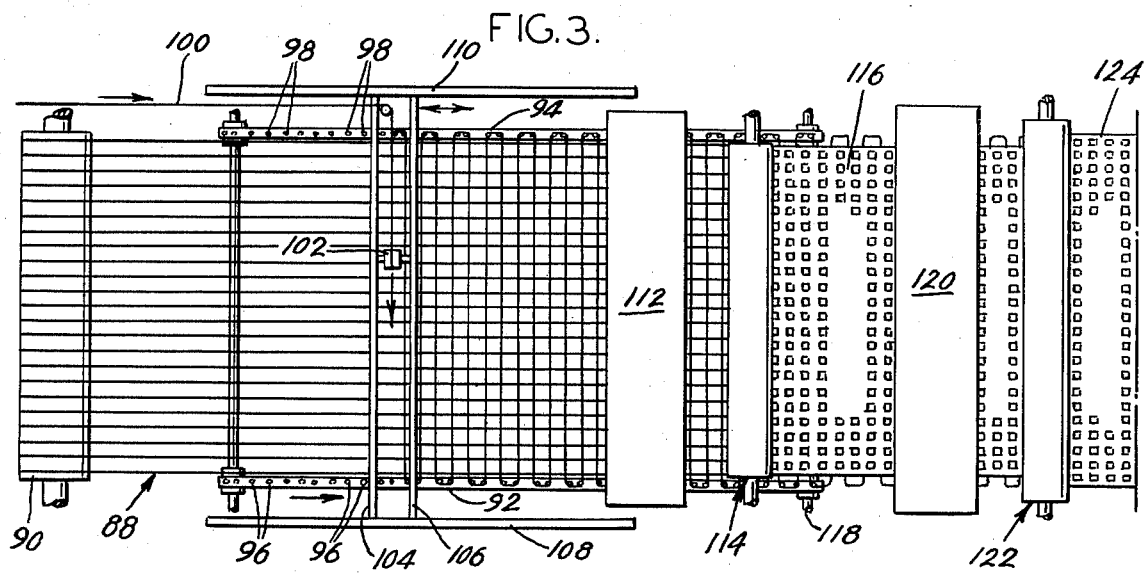
FIG. 3 is a diagrammatic top plan view of an apparatus for making a foraminous sheet using two mutually perpendicular overlying groups of filaments.
Figure 4:
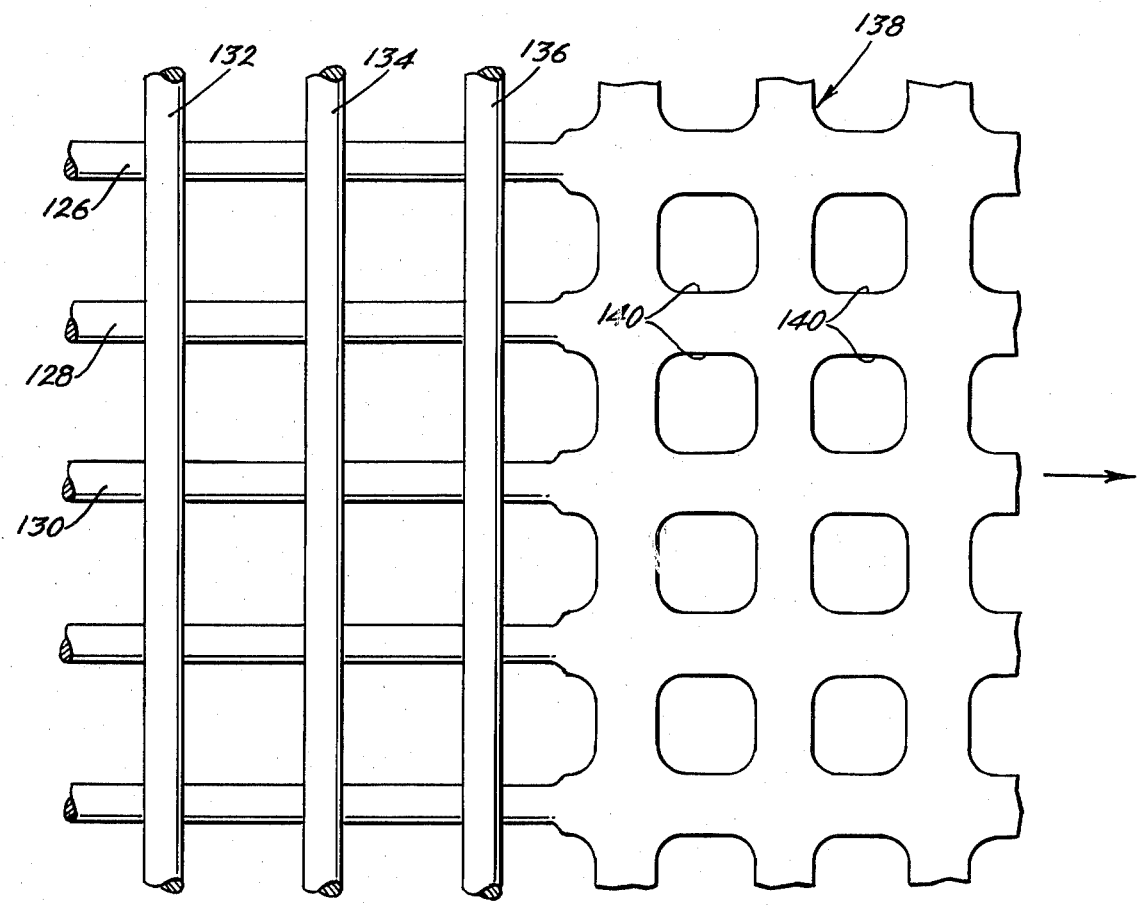
FIG. 4 is a plan view illustrating the manner in which two overlying groups of filaments are formed into a foraminous sheet.

FIGS. 3 and 4 illustrate the manufacture of a foraminous sheet from a rectangular array of filaments comprising two overlying groups. A longitudinal group 88 of filaments is fed over a grooved roll 90, the filaments being supplied from individual supply reels, and being spaced uniformly from one another by the grooves. The apparatus of FIG. 3 is provided with a pair of chains 92 and 94 which are similar to the chains of FIG. 1. These chains move at the same speed as do the filaments of group 88, and are disposed alongside the outermost filaments of the group. Anchor pins 96 and 98 on the respective chains are provided to retain the filaments of a transverse group which overlies group 88. In the apparatus of FIG. 3, the transverse group is formed from a single filament 100 by means of a feeder 102 which reciprocates back and forth in the transverse direction between chains 92 and 94. The reciprocating feeder 102 wraps filament 100 around pairs of pins on chains 92 and 94 as shown, forming a transverse array of uniformly spaced filaments overlying group 88.

Feeder 102 travels along transverse guide tracks 104 and 106, which, in turn, travel in longitudinal guide tracks 108 and 110. Tracks 108 and 110 provide for longitudinal reciprocation of feeder 102, and drive means (not shown) are provided for moving tracks 104 and 106 and feeder 102 in the longitudinal direction. As feeder 102 crosses group 88, it moves longitudinally at the same speed as the filaments of group 88. When it reaches either end of its travel, it is rapidly moved in the opposite longitudinal direction to return it to its original longitudinal position. Feeding of longitudinal group 88 can be interrupted, if necessary, in order to allow time for feeder 102 to move back to its original longitudinal position.

The overlying groups of filaments pass through heater 112 and between the rolls of assembly 114 which converts the overlying groups of filaments into a foraminous sheet 116 having wire loops along its opposite edges. The wire loops disengage the anchor pins at the location of sprocket shaft 118, and sheet 116 passes through heater 120 and between the rolls of roll assembly 122 so that a final product in the form of a finished foraminous sheet is produced at 124.

As shown in FIG. 4, the overlying groups of filaments, including the longitudinal filaments 126, 128 and 130, and transverse filaments 132, 134 and 136 are formed into a sheet 138 having an array of generally rectangular openings 140 by the action of heaters 112 and 120 and roll assemblies 114 and 122. Sufficient pressure is applied by the roll assemblies to impart a substantially uniform thickness to sheet 138 except at the locations of the openings and in the immediate vicinity of the openings. Where the sheet is to be self-sustaining, the pressure applied by the roll assemblies is made sufficient to cause the longitudinal filaments and the transverse filaments to fuse together at their intersections.

The apparatus of FIG. 3 can be modified so that groups of two or more transverse filaments are fed simultaneously. This is accomplished by providing multiple feeders corresponding to feeder 102, and by modifying the longitudinal movement of the feeder assemblies to accommodate the multiple filaments. Simultaneous feeding of multiple filaments in the transverse array produces a more complicated pattern of longitudinally extending filaments at the edges of the sheet being produced. However, the edges of the sheet can easily be sheared off and discarded or recycled in the manufacturing process.

Sheet 138, when formed from steel wires, can be used as a reinforcement in composite laminates, and when made from steel wires and various other filamentary materials, can be used in the manufacture of acoustical panels, radiator covers, and other products.

Figure 5:
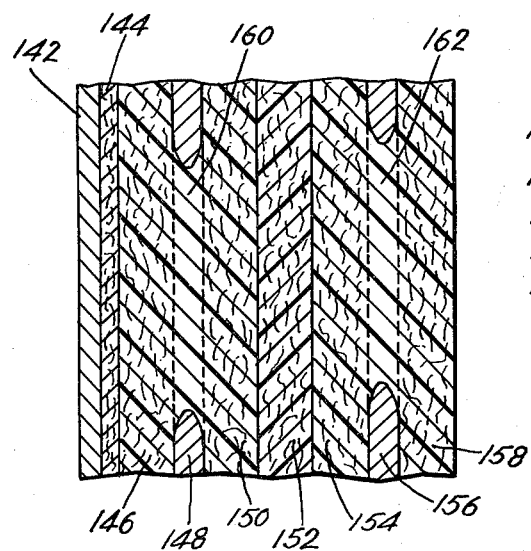
FIG. 5 is a transverse cross-section of a laminate utilizing two spaced foraminous steel foil reinforcing sheets made in accordance with the invention.
Figure 6:
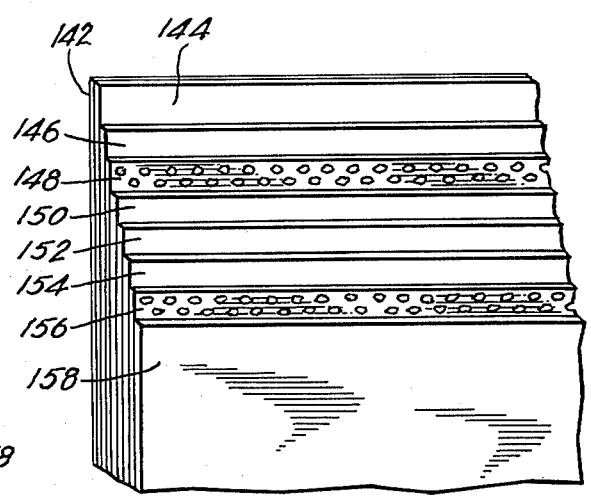
FIG. 6 is a perspective view showing the various layers of the laminate of FIG. 5.

In FIGS. 5 and 6, a composite high-pressure laminate is shown comprising a two-ply decorative layer consisting of a sheet 142 of melamine-impregnated alpha cellulose tissue over a melamine-impregnated alpha cellulose ply 144. Ply 144 can be printed to provide a decorative pattern or color which shows through outer ply 142. Located next to ply 144 is a sheet 146 of phenolic-impregnated kraft paper.

On the opposite side of sheet 146, a foraminous steel sheet 148 is provided.

Additional phenolic-impregnated kraft paper layers are provided at 150, 152 and 154. These are followed by another foraminous steel sheet 156, and finally, another phenolic-impregnated kraft paper layer is provided at 158. These layers are subjected to high pressure and heat in a laminating press to produce a composite laminate, which can be used for various purposes, and which is particularly useful as a facing for wallboards having low-strength cores of gypsum or similar material.

Steel sheets 148 and 156 are spaced from each other within the laminate by phenolic layers 150, 152 and 154, and are preferably at least approximately 0.002 inch in thickness.

As shown in FIG. 5, in the process of lamination in the laminating press, resin bridges 160 and 162 form in the openings of the steel sheets. These resin bridges help to secure the various layers of the laminate together, and obviate the difficulties which are encountered in attempts to secure phenolic layers to imperforate steel sheets by adhesive means. The openings in the steel sheets also reduce the overall weight of the laminate. Steel sheets 148 and 156 produce a marked improvement in the dimensional stability of the laminate, and reduce the tendency of the laminate to shrink under conditions of low humidity. This is especially important when the laminate is used as a facing for a low-strength wallboard core.

The steel sheets used in the laminate of FIGS. 5 and 6 are advantageously made by the process depicted in FIGS. 1–4, as the process produces a sheet which is equivalent in performance to a perforated sheet. That is, it has comparable tensile and compressive strength characteristics, and is substantially flat except at the locations of the openings and in the immediate vicinity thereof, so that the presence of the foraminous sheets does not materially effect the texture of the laminate at the location of the melamine facing ply 142.

It should be noted in FIG. 5 that the edges of the openings in the steel sheets are rounded so that the sheets are not perfectly uniform in thickness in the immediate vicinity of the openings. This is a direct result of the fact that the sheets are made by flattening arrays of overlying wires. This rounding of the edges of the holes is beneficial in that it reduces the effect of the pattern of holes on the texture of surface ply 142.

As indicated previously, the method and apparatus described above can be used for various purposes other than the manufacture of foraminous steel reinforcement sheets for use in laminates. For example, the process and apparatus can be used to make foraminous sheets from a wide variety of materials, including other metals such as aluminum, synthetic resins such as polyvinyl chloride, polyethylene and polypropylene, and various elastomers such as natural rubber, silicone rubber, styrene-butadiene copolymers, and elastomeric urethane polymers, provided that the elastomers are in a non-cured thermoplastic-like state so that they can be molded by the application of heat and pressure.

Various modifications can be made to the specific apparatus shown in FIGS. 1 and 3. For example, although it is considered advantageous to manufacture the foraminous sheets from non-woven meshes, these foraminous sheets can be made by flattening woven meshes, or even knitted meshes. Various other modifications will occur to those skilled in the art, and may be made without departing from the scope of this invention as defined in the following claims.

I claim:

1. In a high-pressure decorative laminate comprising a plurality of layers and adhesive means rigidly securing said layers together, a foraminous steel sheet located between two adjacent layers of said plurality and comprising three overlying groups of parallel steel filaments, the filaments in each group being non-parallel to the filaments in each of the other groups, the intersections of said filaments being flattened to an extent such that said sheet has a substantially uniform thickness except at the locations of its openings and in the immediate vicinity thereof, in which at least part of the adhesive means securing said two adjacent layers together extends through the openings in said foraminous sheet.

2. A high-pressure decorative laminate according to claim 1 in which the steel filaments of said groups are fused together at the intersections thereof.

3. A high-pressure decorative laminate according to claim 1 or 2 in which the steel filaments of each group are arranged at an angle of 60° with respect to the filaments of each of the other groups.

4. A high-pressure decorative laminate according to claim 1 in which the edges of the openings of the sheet are rounded.

* * * * *